(12) United States Patent
Brundula

(10) Patent No.: US 8,594,485 B2
(45) Date of Patent: Nov. 26, 2013

(54) SYSTEMS AND METHODS FOR PRESENTING INCIDENT INFORMATION

(75) Inventor: Steven N. D. Brundula, Chandler, AZ (US)

(73) Assignee: TASER International, Inc., Scottsdale, AZ (US)

( * ) Notice: Subject to any disclaimer, the term of this patent is extended or adjusted under 35 U.S.C. 154(b) by 202 days.

(21) Appl. No.: 12/982,407

(22) Filed: Dec. 30, 2010

(65) Prior Publication Data

US 2012/0170905 A1    Jul. 5, 2012

(51) Int. Cl.
*H04N 9/80* (2006.01)
(52) U.S. Cl.
USPC .......................................................... 386/239
(58) Field of Classification Search
None
See application file for complete search history.

(56) References Cited

U.S. PATENT DOCUMENTS

| | | | |
|---|---|---|---|
| 6,538,623 B1 | 3/2003 | Parnian | |
| 6,823,621 B2 | 11/2004 | Gotfried | |
| 7,158,167 B1 | 1/2007 | Yerazunis | |
| 7,272,179 B2 | 9/2007 | Siemens | |
| 7,363,742 B2 | 4/2008 | Nerheim | |
| 7,631,452 B1 | 12/2009 | Brundula | |
| 7,778,004 B2 | 8/2010 | Nerheim | |
| 7,849,624 B2 | 12/2010 | Holt | |
| 7,886,648 B2 | 2/2011 | Williams | |
| 7,900,388 B2 | 3/2011 | Brundula | |
| 7,944,676 B2 | 5/2011 | Smith | |
| 2004/0146840 A1 | 7/2004 | Hoover | |
| 2005/0110634 A1 | 5/2005 | Salcedo | |
| 2005/0243171 A1 | 11/2005 | Ross | |
| 2006/0201964 A1 | 9/2006 | DiPerna | |
| 2007/0028501 A1* | 2/2007 | Fressola et al. | 42/146 |
| 2009/0063675 A1 | 3/2009 | Faris | |
| 2009/0251311 A1 | 10/2009 | Smith | |
| 2009/0251533 A1 | 10/2009 | Smith | |
| 2009/0251545 A1 | 10/2009 | Shekarri | |
| 2009/0273682 A1 | 11/2009 | Shekarri | |
| 2009/0276708 A1 | 11/2009 | Smith | |

FOREIGN PATENT DOCUMENTS

GB    2404565    2/2005

* cited by examiner

*Primary Examiner* — William C. Vaughn, Jr.
*Assistant Examiner* — Daniel Tekle
(74) *Attorney, Agent, or Firm* — William R. Bachand; Lawrence Letham

(57) ABSTRACT

Systems and methods for presenting incident information provided by video devices and electronic weapons. Information may be selected for presentation by a machine or a human operator. Information from video devices and/or electronic weapons may be temporally aligned (e.g., synchronized) for presenting events that occurred in a temporally related manner. Information for aligning may be collected by a server and/or a video device.

28 Claims, 7 Drawing Sheets

SYSTEMS AND METHODS FOR PRESENTING INCIDENT INFORMATION

FIELD OF THE INVENTION

Embodiments of the present invention relate to systems and methods for preparing a presentation of information related to an incident and/or an operation of one or more electronic weapons.

BACKGROUND OF THE INVENTION

An electronic weapon may be used to apply a force against a human or animal target. An electronic weapon may record information (e.g., a log) about the operations performed by the electronic weapon. A visual and/or audio record may further record the circumstances in which the force of an electronic weapon is applied to a target. A person reviewing a report of an application of force would benefit from a presentation that combines visual and/or audio information with the information regarding the operation of the weapon.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
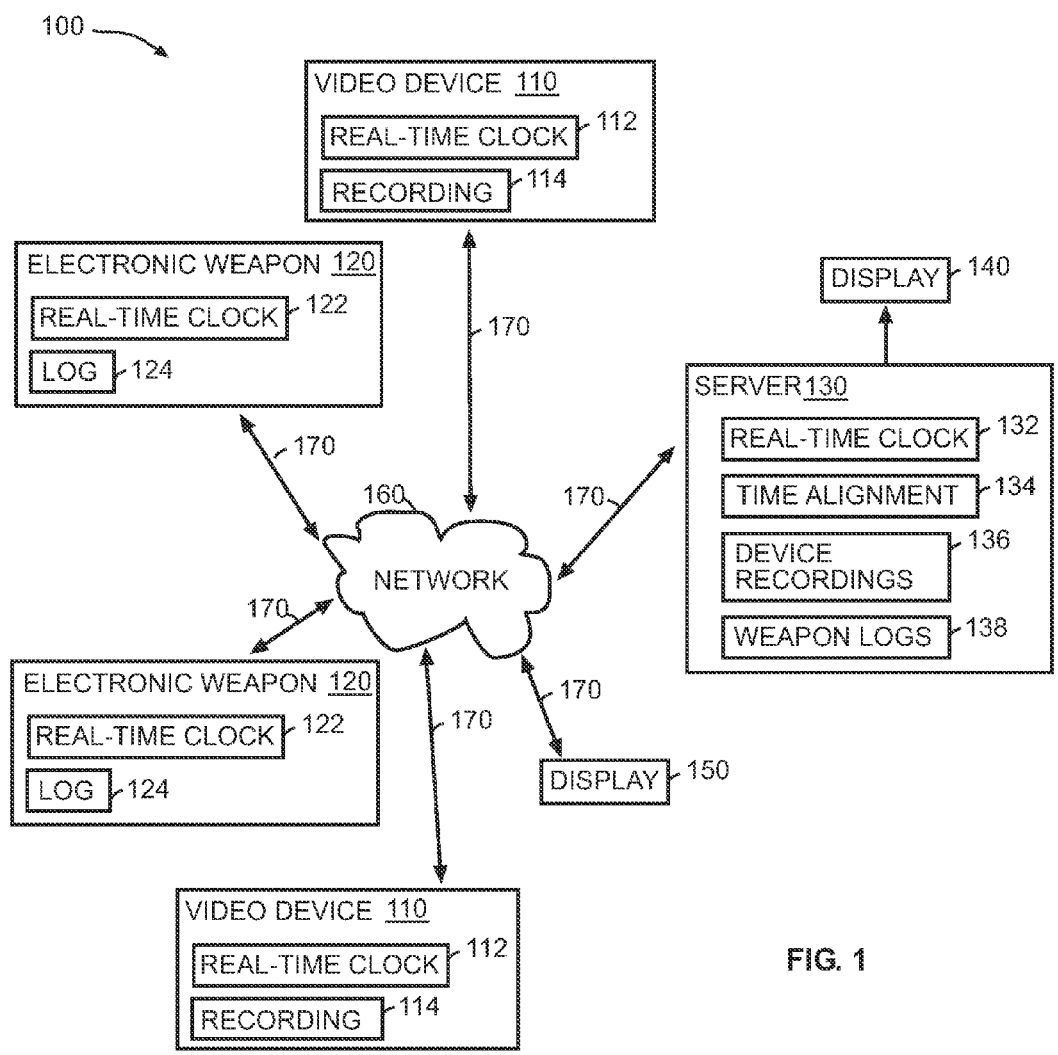
FIG. 1 is a function block diagram of a system for preparing a presentation according to various aspects of the present invention.
Figure 2:
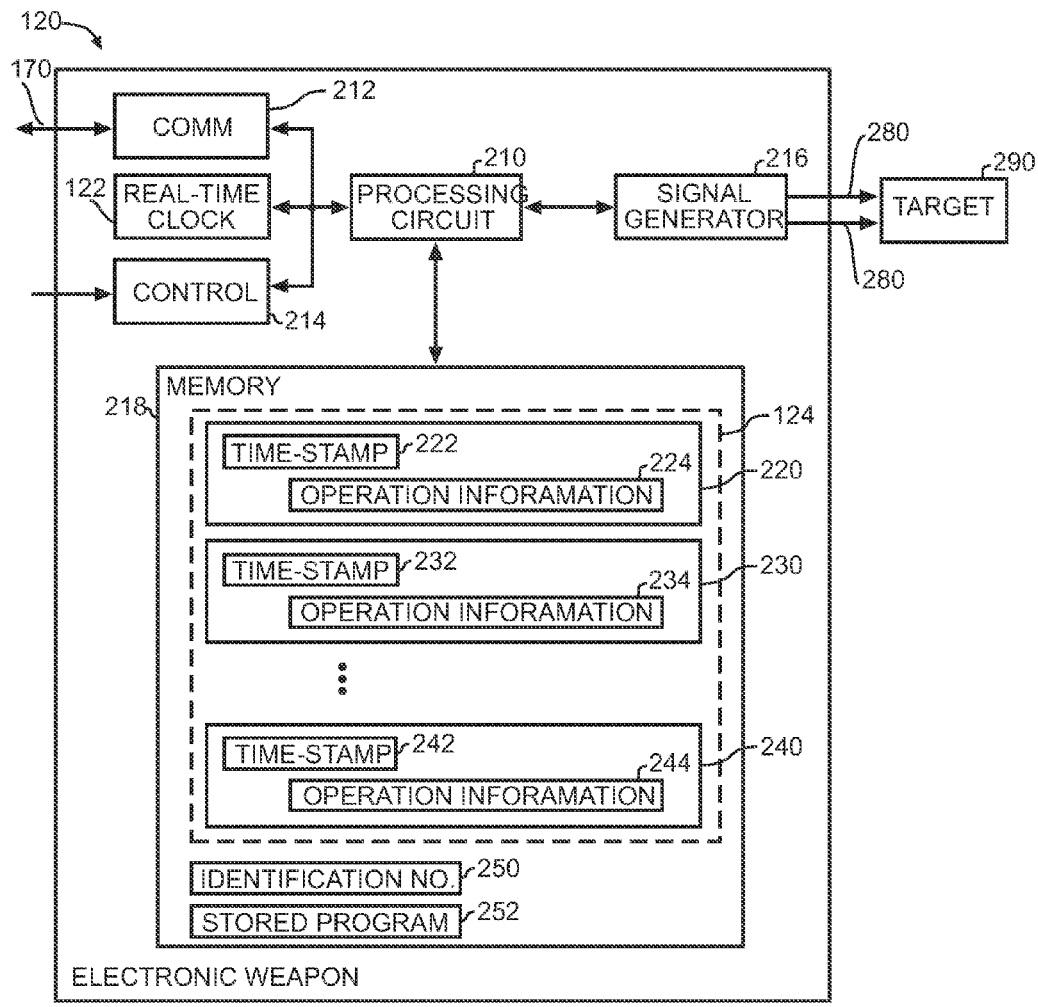
FIG. 2 is a block diagram of an electronic weapon according to various aspects of the present invention.
Figure 3:
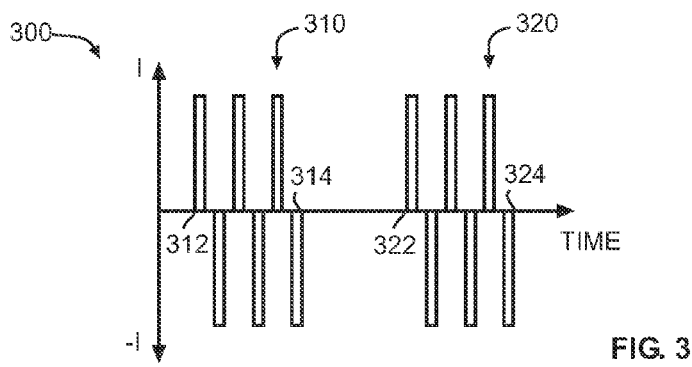
FIG. 3 is a graph of pulses of current provided by an electronic weapon for delivery through a target.
Figure 4:
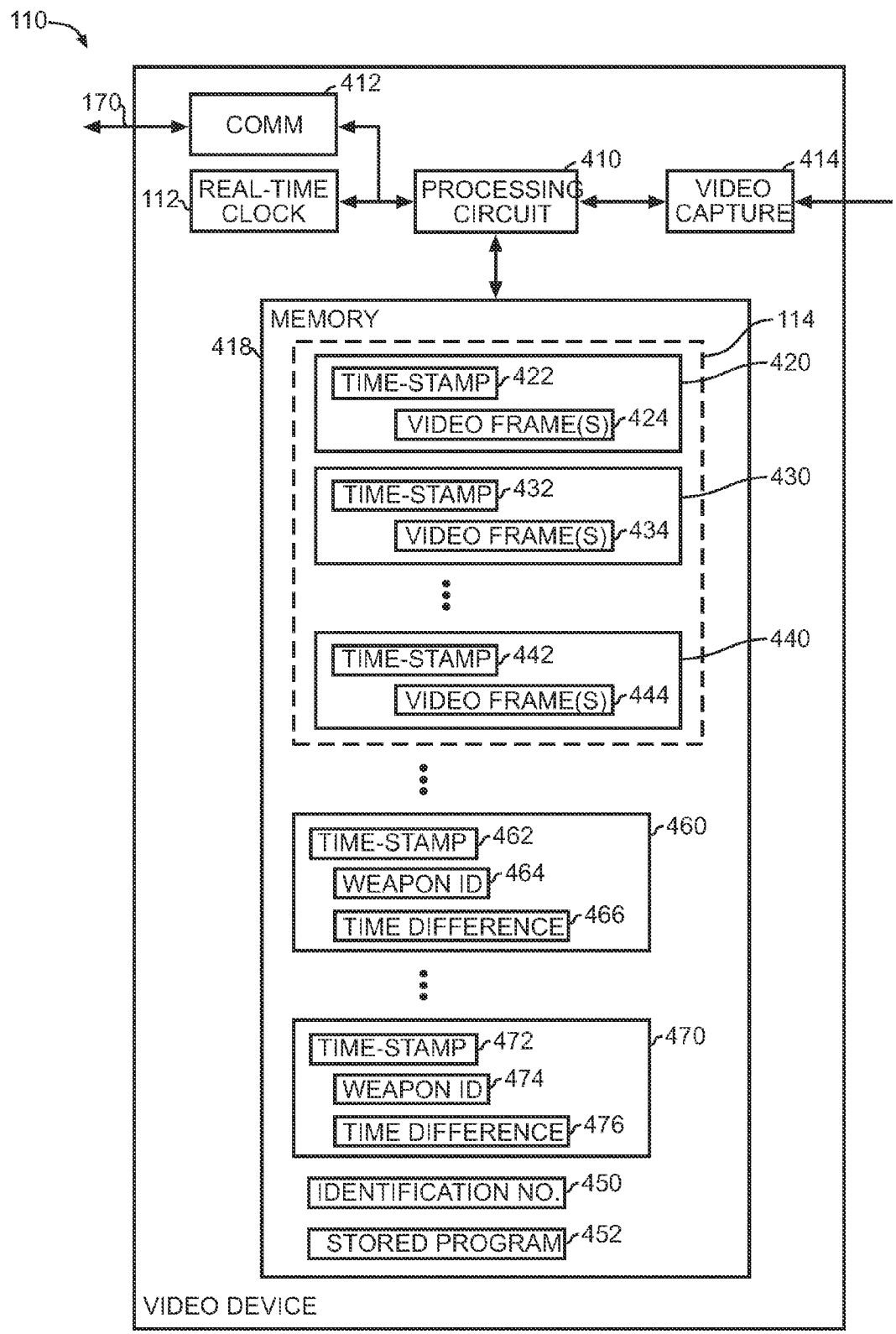
FIG. 4 is a block diagram of a video device according to various aspects of the present invention.
Figure 5:
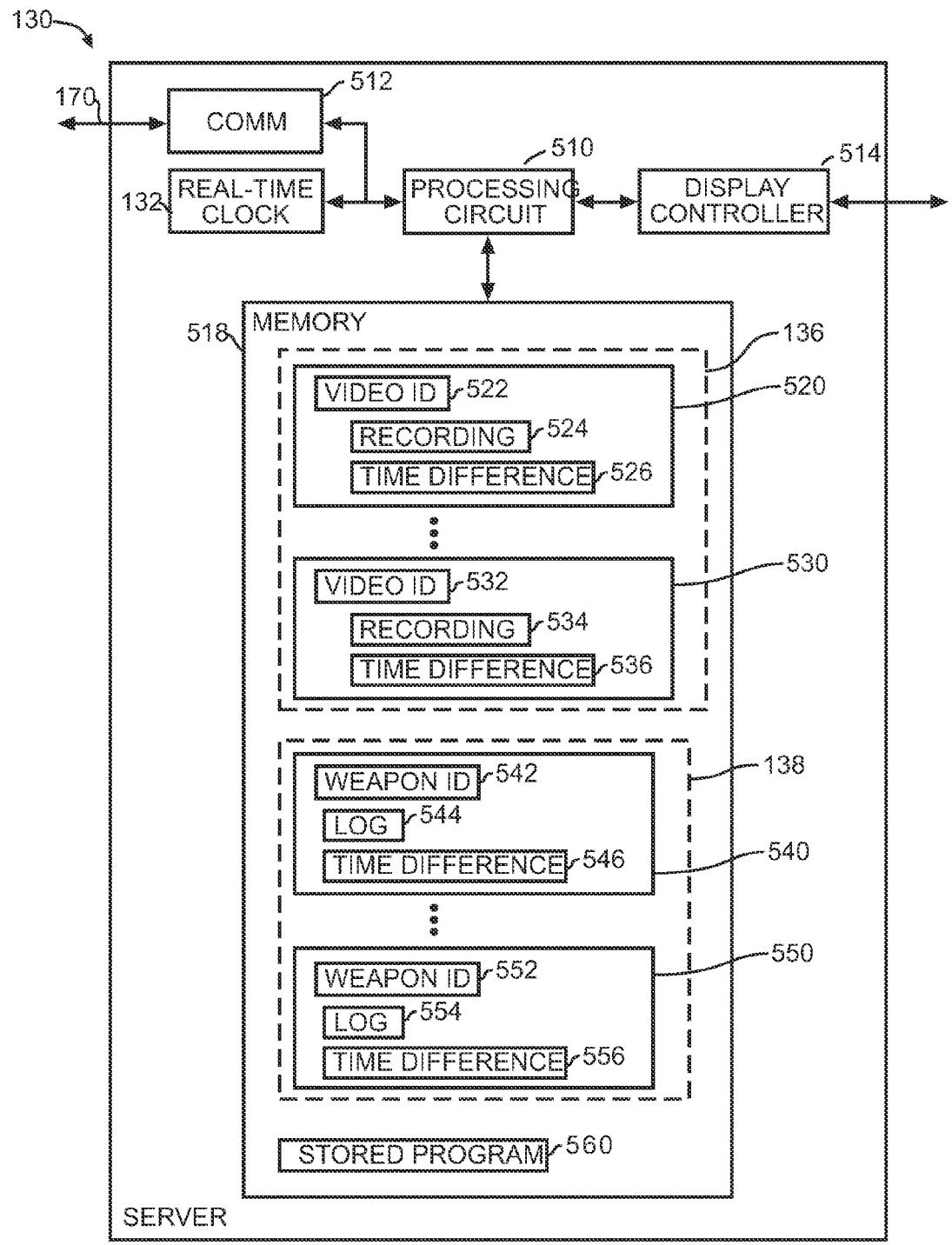
FIG. 5 is a block diagram of a server according to various aspects of the present invention.

An electronic weapon may be used to apply a force to a human or animal target to encourage compliant behavior of the human or animal. An authority (e.g., police, military, security) may desire to encourage compliance of the target to preserve public safety. A potential victim may desire to encourage compliance of the target to avert personal harm. An electronic weapon may record information (e.g., a log) about operations of the electronic weapon and/or a delivery of force toward a target.

An electronic weapon may include any conventional electronic control device ("ECD"), stun gun, and/or electric disabling device. An electronic weapon may include a conventional ECD that launches at least one tethered electrode toward a target to deliver a current via the electrode through the target to impede locomotion by the target. An electronic weapon may include a conventional firearm (e.g., shotgun, pistol, rifle) that launches an electrified projectile having electrodes for contacting the target to deliver a current through the target to impede locomotion by the target.

An electronic weapon may include any device of the type described in U.S. Pat. No. 7,821,766 to Brundula; U.S. Pat. No. 7,631,453 to Brundula; U.S. Pat. No. 7,234,262 to Smith; U.S. Pat. No. 6,636,412 to Smith; and U.S. Pat. No. 7,327,549 to Smith. Each of these patents is herein incorporated by reference for all that it describes.

An electronic weapon may record a log related to operations of the electronic weapon. An electronic weapon may include a real-time clock for recording a time and date when an operation of the weapon is performed. For example, an electronic weapon may record the time and date for an operation of the safety switch, each trigger pull, a change of cartridge, delivery of a pulse of current, delivery of each pulse of current of a series of pulses of current, exchange of a battery module, and/or transfer of data. An electronic weapon may further record whether the electrodes of the electronic weapon made an electrical connection with a target, a quality (e.g., impedance) of the electrical connection with the target, a quantity of current pulses delivered to the target, and/or an amount of charge delivered to the target.

A time and/or date that marks the occurrence of an operation of the weapon and/or an event is herein referred to as a time-stamp. A time-stamp may mark any part or portion of an operation and/or event. A time-stamp may correspond to a start and/or an end time and/or date. For example, a time-stamp may mark each trigger pull of an electronic weapon. A time-stamp may mark release of the trigger. Time-stamps may mark the start and end of delivery of a series of current pulses through a target.

A time-stamp may include a date and a time of day. Any calendar (e.g., Gregorian, Julian, Mayan, custom, proprietary) may be used to provide a date. The resolution (e.g., seconds, milliseconds, microseconds, nanoseconds) of the time of a time-stamp may be sufficiently small to mark events of a desired duration, frequency of occurrence, and proximity of occurrence. A real-time clock may provide a time-stamp.

A log of an electronic weapon may include one or more entries. An entry may correspond to one or more operations of the electronic weapon. An entry may include a value. A value may correspond to an operation of the electronic weapon. For example, an entry for an operation of a safety switch of an electronic weapon may have a value of "on" or "off." An entry may show the value of the safety as being "off." An entry for an operation of a trigger may have a value of "activated," "held," or "released." An entry for the operation of a signal generator may have the value of "start" of delivery of a series of pulses, "end" of delivery of a series of pulses, and "time" since delivery of proceeding pulse.

Entries may be stored in a log in an order (e.g., forward, reverse, chronological). Entries may be retrieved from a log in an order. An entry may include a time-stamp. An entry may omit a time-stamp. In one implementation, entries are stored and retrieved in chronological order of occurrence. Entries that do not include a time-stamp record an operation that occurred at some time between the immediately prior recorded time-stamp and the immediately subsequent recorded time-stamp.

A device (e.g., video device, electronic weapon, server, radios, equipment used by first responders, medical equipment) may provide access to information (e.g., stored, real-time, near-real-time). Information may include recorded information, time-stamps, a present value of a real-time clock, information stored as a log, and information about the device (e.g., identification number, communication parameters, identity of an operator of the device). Providing access to information may include transmitting information, permitting read access to the information, permitting read/write access to the information, and/or providing information responsive to a request for information.

An authority or victim may make a recording of the circumstances (e.g., incident) in which force is applied to a target. The term recording includes video information and/or audio information. Audio information may be related to the recorded visual scenes and/or include information provided by way of annotating the visual scenes. A recording may be captured from the perspective of the authority or victim (e.g., head-worn camera), the perspective of the weapon (e.g., weapon mounted video device), or from the perspective of a location (e.g., mounted security camera). A recording may include the behavior of the subject, actions of the authority or victim, behavior of by-standers, and a result of application of a force by an electronic weapon.

A video device that makes a recording may include a real-time clock. A video device may use the real-time clock to record time-stamps to mark the capture of video information. Recording conventionally include recording a series of frames at a frame rate. In one implementation, a video device records a time-stamp for each frame of video captured. In another implementation, the video device records a time-stamp at a start and at an end of a series of frames.

A recording may further include a record of operations (e.g., on, off, record, stop record, privacy, annotate) of the video device. A record of operations of a video device may include time-stamps to mark a time of performance of the operation of the video device.

Frames, time-stamps, and/or records of operations of a video device may be stored as a record of a recording. A recording may include one or more records. A record may include frames, time-stamps, and operations for a specific time. The quantity of frames, time-stamps, and records of operations stored in a record may correspond to a convention recording format (e.g., MPEG-4, Blue-ray, DVD, QuickTime). In one implementation, a record of a recording includes one frame and a time-stamp.

A recording may be prepared for presentation. A log of an electronic weapon may be prepared for presentation. A presentation may include a recording recorded by a video device (e.g., video, audio, operations) and logs from one or more electronic weapons. A presentation may include time-stamps recorded by the video device and/or the electronic weapon. A presentation may further include information added to annotate and/or explain the recording and/or weapon log. A presentation may be reviewed. A presentation may be reviewed for compliance with law by an authority, effectiveness of defensive and/or offensive measures, behavior of an authority, behavior of a victim, behavior of a target, operation of the electronic weapon, and/or an amount of force delivered to a target.

In accordance with various aspects of the present invention, recordings and logs of electronic weapons may be prepared for presentation together. Recordings and weapon logs may be edited (e.g., combined, redacted, selected overlaid) for use in the same presentation. For example, a recording may be selected to show a target. A weapon log may be selected to show weapons in the vicinity of the target. A recording may be selected to show the effect of an application of force on the target. A weapon log may be selected to show which weapons provided the force or which weapons likely provided the force to the target as shown in the recording.

A recording and a weapon log may be aligned (e.g., synchronized) in accordance with time for creating a presentation. Two or more recordings may be aligned to each other. Two or more weapon logs may be aligned to each other. One or more recording may be aligned to one or more weapon log and/or one or more other devices. Synchronization may align information for presentation in accordance with a time of occurrence. A time of occurrence may be determined with respect to a real-time clock (e.g., a time reference). A time reference may include the real-time clock of one or more video devices, the real-time clock of one or more electronic weapons, and/or any other real-time clock such as the real-time clock of a server that receives access to a recording and/or a weapon log.

Other devices used (e.g., before, during, after) at an incident may record information collected by the device and/or information about an operation of the device. For example, medical personnel may use medical equipment to record the vital signs of people injured at the incident or make a record of procedures administered. Radios may record a location and time of use. Devices used by investigative personnel may record measurements, data, chemical properties, and/or physical properties (e.g., heat, light, weight, color, intensity, position, length, resistance). Such devices may include a real-time clock that provides time-stamps for storing with the information. Stored information may be transferred to a server, aligned, and prepared for presentation as discussed herein with respect to video devices and electronic weapons.

In accordance with various aspects of the present invention, a difference in time between real-time clocks may be used to relate the time as measured by one real-time clock to the time as measured by other real-time clocks. Knowledge of a difference in time between real-time clocks may assist relating a time of an event as measured by one real-time clock to a time of the event as measured by another real-time clock. A difference in time may be used to align a recording having time-stamps provided by one real-time clock with a weapon log having time-stamps provided by another real-time clock. Aligning may include translating the time of occurrence of an event as measured by one real-time clock to the time of another real-time clock. By aligning a recording and a weapon log, a presentation may concurrently explain what occurred at about the same time. Aligned recordings and/or logs may be presented in an order of temporal occurrence.

Time-stamps recorded with video and weapon information may be translated using a difference in time to relate to any real-time clock. The time-stamps may then be used to select information for presentation at a selected time. Time-stamps may further be used to present a sequence of events in time and/or an occurrence of events as recorded by different devices (e.g., video devices, electronic weapons). Knowledge of the difference in time between the real-time clocks of devices that provided information (e.g., recording, log) having time-stamps permits information recorded by independent devices to be aligned and presented to recreate at least a portion of an incident in a temporally accurate manner.

For example, system 100 of FIGS. 1-12, according to various aspects of the present invention, records video and/or audio information, records weapon information, prepares presentations of recordings and/or weapon logs, and makes the presentation available for display and/or review. System 100 may provide a presentation of information selected from one or more recordings together with a selection of one or more logs of electronic weapons. System 100, according to various aspects of the present invention, may align all or part of a recording with all or part of one or more weapon logs with respect to time. System 100 may prepare a presentation based on the results of aligning.

System 100 may include one or more video devices 110, one or more electronic weapons 120, one or more servers 130, one or more displays 140, and one or more displays 150.

Video device 110 includes real-time clock 112 and recording 114. Electronic weapon includes real-time clock 122 and log 124. Server 130 includes real-time clock 132, time alignment function 134, recordings 136, and weapon logs 138. Time alignment function 134 may be used to align information as discussed above.

The devices (e.g., video device, electronic weapon, server, display) of a system may communicate with each other. Devices may communicate to provide access to information. For example, video devices 110 and electronic weapons 120 may provide access to recordings and/or logs. As discussed above, providing access to information may include a transfer of information. Information may be transferred between devices. Information may be transferred via any type of conventional communication channel (e.g., wired, wireless, USB, internet, LAN). Information may be transferred directly between devices, through an intermediate device, and/or via a network.

In one implementation, video devices 110, electronic weapons 120, server 130, and display 150 communicate to provide access to information, request information, and/or receive information via channels 170 and network 160. Network 160 may be implemented using conventional network hardware and software.

Electronic weapon 120 performs the functions of an electronic weapon as discussed above. Electronic weapon 120 includes real-time clock 122, processing circuit 210, communication ("comm") block 212, control 214, signal generator 216, and memory 218.

A processing circuit performs an operation and/or controls performance of operations of electronic weapon 120. As discussed at least in part above, an operation of an electronic weapon includes providing a force (e.g., current pulses) through a target, detecting an operation of a trigger, detecting an operation of a safety, launching wire-tethered electrodes, launching a projectile, communicating information, storing information, retrieving information, recording a use of force against a target, detecting an amount of current provided through a target, detecting an electrical coupling with a target, and providing information to a user. A processing circuit may cooperate with a memory to store a weapon log.

Processing circuit 210 may be implemented with any conventional electronic device and program (e.g., firmware, software) for performing an operation and/or controlling an operation. A processing circuit may be implemented with a conventional microprocessor that executes a stored program, logic gates, programmable logic gates, a signal processor, and data buses. A processing circuit may cooperate with a memory to receive program instructions to perform an operation of the electronic weapon. A processing circuit may provide information to a memory for storage.

A memory may include any conventional storage device (e.g., Flash, RAM, ROM, optical, magnetic). A memory may receive information (e.g., data) for storage. A memory may provide access to information. A memory may provide access to information responsive to a request. A memory may store information permanently (e.g., non-volatile) and/or temporarily (e.g., volatile). A memory may store information in any conventional organization. A memory may provide information in any conventional organization. A memory may provide information in parallel and/or in serial.

A communication block communicates with other devices. A communication block sends and/or receives information. A communication block may be implemented using conventional hardware and software for communicating. A processing circuit may cooperate with a communication block to send information to other devices and to receive information from other devices. A processing circuit may store received information in a memory. A processing circuit may retrieve information from a memory for communication via a communication block.

A control detects an action from a user of the electronic weapon to perform an operation of the electronic weapon. A control may include a trigger, a safety, a touch screen, and/or a switch. A control may provide a signal to a processor. Responsive to a signal, the processor may perform a operation of the electronic weapon as discussed above.

A signal generator provides a force for use against a target. A force includes a current for delivery through target tissue. A current may ionize air in a gap between an electrode that provides the current and target tissue. A current may include one or more pulses of current. A current may include a series of pulses delivered at a rate of about 10 to 20 pulses per second for a period of about 5 to 60 seconds using technologies discussed in the documents incorporated by reference. A signal generator may include a store of energy (e.g., battery, capacitance, inductance) for providing the current. For example, signal generator 216 may provide a current through target 290 via tethered electrodes 280.

A real-time clock counts time. A real-time clock may provide a time and a date as discussed above with respect to a time-stamp. The real-time clock may be initialized at a time of manufacture. A processing circuit may receive a present time and date from a real-time clock to use as a time-stamp to mark an operation and/or event. A processing circuit may store a time-stamp along with information in a memory. Information of operations of the electronic weapon includes a log of an electronic weapon as discussed above. An electronic weapon log may further include information about any circuit of the weapon (e.g., communication block, real-time clock, control, signal generator, memory), delivery of a current, failure to deliver a current, communication, and information communicated. Time-stamped information may comprise an entry for a log. Operation information 124 may be implemented as a log using conventional techniques.

In an implementation, control 214 includes a trigger (e.g., switch). An operation of the trigger by a user of electronic weapon 120 provides a signal to processing circuit 210. Processing circuit 210 includes a conventional microprocessor that executes stored program 252 from memory 218.

Responsive to the trigger, processing circuit 210 controls a launch device (not shown) to launch tethered electrodes 280 toward a target. Processing circuit 210 controls signal generator 216 to provide a series of pulses of current (e.g., 310) via launched electrodes 280 through the target. At the start of delivery of the series of pulses (e.g., 312), processing circuit 210 requests the present date and time from real-time clock 122. Processing circuit 210 stores the date and time as time-stamp 222 and operation information 224 of log entry 220 to indicate the starting time (e.g., 312) of a series of pulses (310).

At the end of the series of pulses (e.g., 314), processing circuit 210 requests a present date and time from real-time clock 122. Processing circuit 210 stores the date and time as time-stamp 232 and operation information 234 of log entry 230 to indicate the end of the series of pulses (e.g., 312). For each series of pulses (e.g., 310, 320), processing circuit 210 records the start time (312, 322) and end time (324, 324) of each series respectively. Information stored in log entry 124 may further include a time (e.g., delay) between each pulse of a series, a time (e.g., 314-322) between series of pulses (e.g., 310, 320), an amount of charge per pulse, a total amount of charge delivered, electrode impedance, target biological information (e.g., heart rate, impedance), and current delivery voltage.

Processing circuit 210 stores operational information in log entries 220-240 for a time (e.g., a shift, a day, an incident). Each time-stamp and operation information pair (e.g., 220, 230, 240) form an entry of the log of operations of electronic weapon 120. Electronic weapon 120 may provide access to log 124 for receipt by other devices. Electronic weapon 120 may further provide access to identification number 250. Electronic weapon identification number 250 may be used to identify the source of log 124 and/or to distinguish log 124 of one device from log 124 of another device. Each electronic weapon 120 may include a unique identification number 250.

Communication block 212 may be used to provide access to log 124. Communication block 212 may establish communication with one or more other devices (e.g., video device, electronic weapon, server) to transfer and/or receive information. Communication block 212 may use any conventional wired or wireless communication protocol to communicate with other devices directly or via a network. Functions of communication block 212 may be performed all or in part by processing circuit 210. Processing circuit 210 may prepare information, such as log 124, a present time of real-time clock 122, and identification number 250, for transmission to another device.

In an implementation, processing circuit 210 uses communication block 212 to send log 124 and identification number 250 to server 130. In another implementation, processing circuit 210 uses communication block 212 to send a present time of real-time clock 122 and identification number 250 to video device 110.

Video device 110 performs the functions of a video device as discussed above. Video device 110 includes real-time clock 112, processing circuit 410, communication ("comm") circuit 412, video capture function 414, and memory 418.

Real-time clock 112 performs the functions of a real-time clock discussed above.

Processing circuit 410 performs an operation and/or controls performance of operations of video device 110. Processing circuit 410 may control video capture function 414 to capture a recording. Processing circuit 410 may store records (420, 430, 44) of recording 114. Real-time clock 112 may provide one or more time-stamps (422, 432, 442) for storage with a record. Processing circuit 410 may further store annotating information that annotates a record (420, 430, 440) and/or recording 114. Processing circuit 410 may cooperate with memory 418 to store and retrieve a record and/or a recording. Processing circuit 410 may be implemented with any conventional electronic device as discussed above.

Processing circuit 410 may execute stored program 452 to perform the functions of video device 110. Stored program 452 may be stored in memory 418.

A video capture function captures video and/or audio information about the environment surrounding video device 110 to make one or more recordings. A video capture function may be implemented with any conventional video camera, still camera, infrared camera, microphone, and/or CCD. Video capture function 414 may be packaged separate from the other components of video device 110 and provide a recording to processing circuit 410 via a wired or wireless channel. Video capture function 414 may be worn by a user of video device 110. Video device 110 including video capture function 414 may be worn by a user.

A video device may be powered by a battery.

Memory 418 may perform the functions of a memory as discussed above. Memory 418 may include the conventional memory devices discussed above. Memory 418 may store records 420, 430, 440 and/or recording 114 in any conventional format (e.g., MPEG-4, Blue-ray, DVD, QuickTime). Recording 114 may include video frames, audio information, annotation information, and time-stamps.

Memory 418 may store time-stamps (422, 432, 442) with video and/or annotation frames (424, 434, 444) in a record (420, 430, 440). One or more records (420, 430, 440) may be stored as recording 114. Memory 418 may store one or more recordings 114. Time-stamps 422, 432, 442 may include a date and time, in accordance with real-time clock 112, of capture of a record, a recording, and/or an annotation. A time-stamp may relate to one or more frames of a record and/or one or more annotations. Each time-stamp and frame pair form a record (420, 430, 440) of recording 114 of a video device 110. Video device 110 may provide access to recording 114 for receipt by other devices. Memory 418 may provide access to one or more recordings for alignment, for preparing a presentation, and/or for presentation.

Video device 110 may further provide access to identification number 450 to identify the source of recording 114. Identification number 450 may be used to distinguish recording 114 of one video device from recording 114 of another video device. Each video device 110 may include a unique identification number 450.

Memory 418 may further store and provide access to information about electronic weapons that communicate with video device 110. As discussed below, an electronic weapon may communicate with video device 110 via communication block 412. Video device 110 may record a time and date of the communication, a weapon identification number (e.g., 250) of the weapon, and a present time of the real-time clock (e.g., 122) of the electronic weapon and/or a difference in time between the real-time clock of the electronic weapon and real-time clock 112 of the video device. As discussed below, the difference in time may be used to align a recording with a weapon log for presentation.

Communication block 412 performs the functions of a communication block discussed above. Communication block 412 may be used to provide access to recording 114. Communication block 412 may establish communication with one or more other devices to transfer and/or receive information. Communication block 412 may use any conventional wired and/or wireless communication protocol for communication. Processing circuit 410 may cooperate with communication block 412 to provide access to recording 114 and/or weapon detection reports 460 and 470. Communication block 412 may further communicate a present time of real-time clock 112 and video device identification number 450.

In an implementation, video capture function 414 captures video and/or audio information about an incident. Video capture function 414 provides video and/or audio information to processing circuit 410. Processing circuit 410 creates records (420, 430, 440) and recordings (one or more 114) with time-stamps from real-time clock 112 for storage in memory 418. Video device 110 stores one or more records and/or recordings for a definite time (e.g., a shift, a day, an incident) or indefinitely. Video device 110 uses communication block 412 to transmit recording 114, a present time of real-time clock 112, and identification number 450 to a server.

Server 130 performs the functions of a server as discussed above. Server 130 may be implemented as a conventional server and may perform the functions of a conventional server in addition to the functions discussed herein. Server 130 may include communication block 512, real-time clock 132, processing circuit 510, display controller 514, and memory 518.

Processing circuit 510 performs the functions of a processing circuit discussed above. Processing circuit 510 may be implemented with the processing circuits discussed above. Processing circuit 510 may execute stored program 560 to perform all or some of the functions of server 130.

Communication block 512 performs the functions of a communication block as discussed above. Communication block 512 may communicate with any conventional device using any conventional communication protocol directly or via a network. Communication block 512 may communicate with one or more video devices 110 and/or electronic weapons 120. Server 130 may request and receive via communication block 512 recording 114, log 124, video device identification numbers 450, weapon detection reports 460-470, electronic weapon identification numbers 250, and a present time from any real-time clock (e.g., 112, 122).

Processing circuit 510 may store received information in memory 518. Memory 518 may perform the functions of a memory discussed above. Memory 518 may include the conventional circuits discussed above. Processing circuit 510 may cooperate with memory 518 to store and retrieve information as discussed above.

Server 130 may receive and store recording 114 from one or more video devices 110 as device recording 136. Device recording 136 may include a record (520, 530) for each video device 110 that includes recording 114 respectively. Each record (520, 530) may include a video device identification number (522, 532) that corresponds to the video identification number 450 of the respective video devices 110, recording (524, 534) that corresponds to recording 114 of the respective video devices 110, and time difference (526, 536) that includes information to determine a difference in time between the real-time clock of the respective video devices 110 and real-time clock 132 of server 130.

Server 130 may receive and store in memory 518 weapon logs 138 from one or more electronic weapons 120. Weapon record 138 may include a weapon record (540, 550) from each electronic weapon 120 respectively. Each weapon record (540, 550) may include weapon identification number (542, 554) that corresponds to respective weapon identification numbers 250, weapon log(544, 554) that corresponds to respective log 124, and time difference (546, 556) that includes information to determine a difference in time between the real-time clock of the respective electronic weapons 120 and real-time clock 132 of server 130.

Server 130 may further receive and store weapon detection reports 460 and 470 if created by a video device that provides information to server 130. Identification number 450 of the device that provides weapon detection reports 460 and 470 may be stored by server 130 in association with weapon detection reports 460 and 470.

Real-time clock 132 performs the functions of a real-time clock as discussed above. Processing circuit 510 may request a present date and time from real-time clock 132. Processing circuit 510 may request, via communication block 512, a present date and time from the real-time clock (e.g., 112, 122) of another device (110, 120). Because real-time clocks 112, 122, and 132 operate independently of each other and may not be synchronized with each other at any time, real-time clocks 112, 122, and 132 may report different times.

When requesting a present time of a real-time clock of another device via communication block 512, steps may be taken to account for the communication delay between server 130 and the other device. For example, processing circuit 512 may record a start time as per real-time clock 132 when the request is made. Processing circuit 510 may further record a time of arrival, as per real-time clock 132, of the message containing the present time of the other real-time clock. The difference between the start time of the request and the arrival time of the present time from the other real-time clock represents the delay in communication. The delay in communication may be added to the present time as received from the other real-time clock to provide the time of the other real-time clock accounting for communication delays. The time of another real-time clock may be used to determine the difference in time between real-time clock 132 and the other real-time clock (e.g., 112, 122).

Server 130 may store a time of real-time clock 132 and the time of other real-time clocks. Server 130 may store a time of real-time clock 132 and a difference in time between real-time clock 132 and other real-time clocks as discussed above. Knowing a time of other real-time clocks and the present time of real-time clock 132 or the present time of real-time clock 132 and a difference in time between real-time clock 132 and other real-time clocks permits server 130 to temporally align (e.g., align in time, synchronize) information received from various devices. Information may be aligned to prepare a presentation that describes an event. A present value of real-time clock may be requested, received, and stored by server 130 along with receipt of information from another device.

Server 130 may prepare a presentation of video and/or weapon information. Server 130 may provide access to a presentation for display. Display controller 514 may receive a presentation from processing circuit 510 and provide the presentation to display 140 in such a manner that the presentation may be presented on display 140. A display controller may be implemented using any convention circuits, devices, and software for presenting digital and/or analog information. A display may be implemented using any conventional video and/or audio device (e.g., monitors, LCD screens, speakers, headphones, cellular telephones, CCTV).

Server 130 may further provide via communication block 512 a presentation to a remote display 150 (e.g., download in full, streaming, on demand based on recording, on demand based on incident location). Remote display 150 may receive and display a presentation.

Server 130 may prepare a presentation based on a recording alone, weapon information alone, or one or more recordings combined with one or more weapon logs. A recording may be presented as a still image, a series of still images that show a progression of events, or a full motion video. Audio may be included with the images. Weapon operation information may be presented in particular and/or as a summary for an incident (e.g., summary per weapon, summary per target). A summary of weapon information may include compiled information such as a total quantity of electrodes launched, a total quantity of electrodes that formed a circuit with a target, a total quantity of pulses or a total amount of charge delivered, a total quantity of targets halted and/or other information in an overview fashion.

Weapon information may be aligned to and presented with still or full motion images that occurred at approximately the same time. Aligned information may change with each still or frame of a video. Aligned information may be presented using conventional graphics (e.g., charts, graphs, indicators, icons) that are updated as the events of an incident progresses or in any other manner in which information is presented that is relevant to the time of occurrence in the video. Graphics may be combined (e.g., merged, overlaid, substituted, scrolled, faded in, faded out, interspersed, inserted) with video information using any conventional technique. For example, a running total of pulses delivered to a target may be provided or an indicator (e.g., asterisk) may appear in the video of the presentation for each pulse series delivered to a target.

Figure 6:
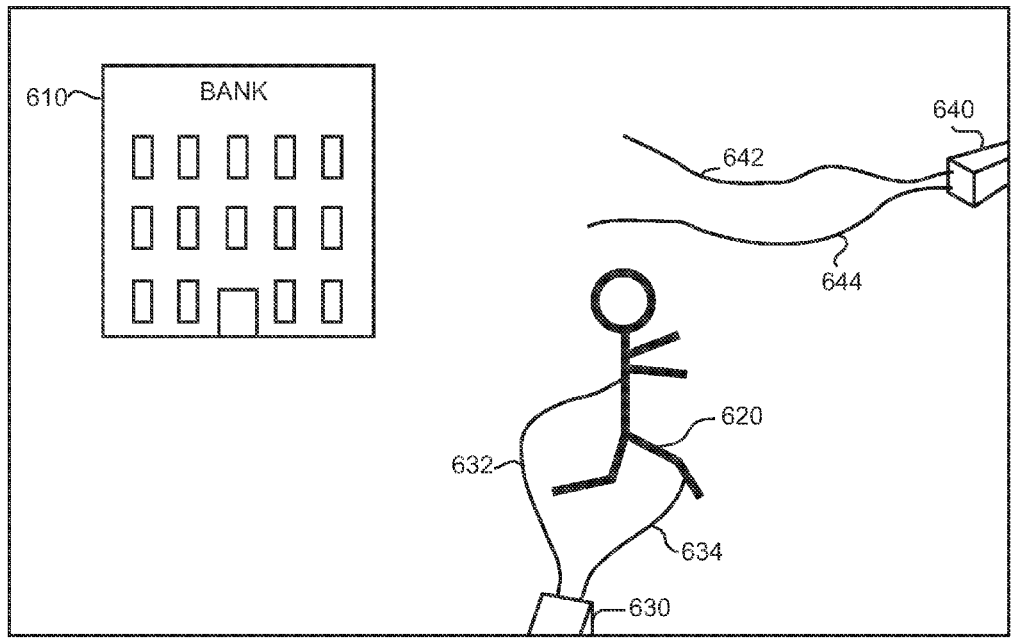
FIG. 6 is a presentation of a recording captured at an incident.

For example, the image of FIG. 6 is a frame from a video captured at the scene of a bank robbery. The frame of FIG. 6 shows suspect 620 fleeing from bank 610. The image is taken from the perspective of the user of electronic weapon 630. Electronic weapon 640 is in the image, but the user of electronic weapon 640 is outside of the field of view of the video device used to capture the incident. The frame of video shown in FIG. 6 is one frame of a recording comprising a sequence of frames that show suspect 620 exiting bank 610, launch of tethered electrodes 632 and 634 from electronic weapon 630, launch of electrodes 642 and 644 from electronic weapon 640, impact of electrodes 632 and 634 with suspect 620, a miss by electrodes 642 and 644, and the application of a force on suspect 620 by electronic weapon 630 via electrodes 632 and 634.

As discussed above, each frame of the recording that includes the frame of FIG. 6 is marked with a time-stamp. Each electronic weapon 630 and 640 further stores operation information with respective time-stamps to form a log. The recording and the weapon logs may be provided to a server for alignment and preparing a presentation. The presentation may include a recording only or a recording combined with information about the operation of weapons 630 and 640.

A presentation based on a recording only may include the sequence of frames discussed above. All frames of the recording do not need to be part of a presentation. A presentation may include only a portion of the frames of a sequence. Frames may be selected by a server in accordance with a selection criteria and/or by a human operator. Weapon logs may be prepared for presentation. Weapon logs may be selected for presentation by a server and/or by a human operator. Weapon logs may be combined for presentation with a recording with or without aligning the weapon log to the recording (e.g., unaligned overall summary of total charged delivered).

Figure 7:
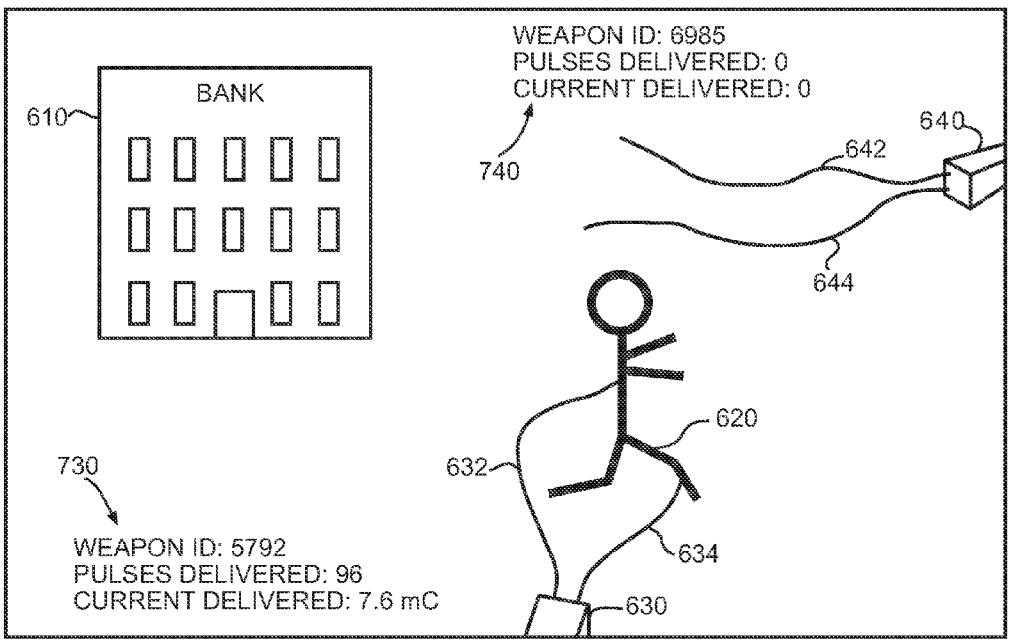
FIG. 7 is the presentation of the recording of FIG. 6 and logs of electronic weapons at the incident according to various aspects of the present invention.

In an example of weapon information combined with a recording, FIG. 7 shows operation information 730 about weapon 630 (weapon ID 5792) and operation information 740 about weapon 640 (weapon ID 6985). In one implementation, information 730 and 740 are summaries of the operation of weapons 630 and 640 respectively during an incident. In this example, operation information 730 and 740 shows the weapon ID, the quantity of pulses delivered and the amount of current delivered during the incident by each weapon. In this example, electronic weapon 640 did not establish an electrical circuit with suspect 620, so during the incident, electronic weapon 640 did not deliver any charge to suspect 620. Weapon 630 established an electrical circuit with suspect 620 during the incident, provided 96 pulses of current that delivered about 7.6 millicoulombs of charge through suspect 620. The information as to the amount of charge provided through suspect 620 is presented without regard to the time of delivery.

In another example, the information about the operation of weapon 630 and/or 640 may be aligned to the time of the captured frames. Once aligned, weapon logs may be presented as each operation of the weapon occurs with respect to the time of the events captured in the recording. For example, if the weapon information from electronic weapon 630 is aligned to the recording, the number of pulses and/or the amount of charge delivered through the target may be updated as each frame of the video sequence is shown. Aligning the weapon log with the recording provides a presentation that displays an effect of the force applied to the target over time.

As discussed above, alignment may be accomplished by determining a difference in time between the real-time clock of the video device and the real-time clock of any electronic weapon respectively. Upon receiving information from a device (e.g., video, weapon), a server may determine a difference in time between the server real-time clock 132 and the real-time clock of the device (e.g., 112, 122). The difference in time may be recorded or the time of the server real-time clock 132 and the time of the real-time clock of the device (e.g., 112, 122) may be stored and a difference in time calculated later. The time of the real-time clock of the device may be adjusted to account for communication delays as discussed above prior to storing.

In one implementation, time difference 526 includes a time of real-time clock 132 and a time of the real-time clock (e.g., 112) of the video device (e.g., 110) that provided recording 524. The time recorded in time difference 526 is the time of real-time clock 132 and the video device real-time clock at the time server 130 received recording 524. Likewise, difference in time 536, 546, and 556 includes the time of the server real-time clock 132 and the time of the device real-time clock at the time of receiving the respective video or weapon information. Storing the present time of the server real-time clock 132 and the present time of the device real-time clock (e.g., 112, 122), adjusted for communication delays, enables an accurate difference in time to be calculated at any time in the future without regard to drift between real-time clocks that may occur in the future.

A difference in time between a real-time clock 112 of a video device 110 and a real-time clock 122 of an electronic weapon 120 may be determined with respect to server real-time clock 132. The difference in time may be used to align time-stamps of one or more recordings to the time-stamps of one or more weapons information or vice versa, to prepare a presentation that presents information that occurred at approximately the same time.

Figure 8:
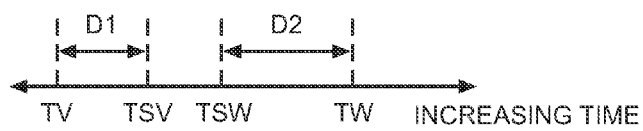
FIGS. 8-10 are timing diagrams for determining a difference in time according to various aspects of the present invention.

For example, referring to FIG. 8, the present time of server real-time clock 132 and the present time of video device real-time clock 112 adjusted for communication delays at the time of transfer of a recording from video device 110 to the server 130 are TSV and TV respectively. The present time of server real-time clock 132 and the present time of weapon real-time clock 122 adjusted for communication delays at the time of transfer of weapon information from electronic weapon 120 to server 130 are TSW and TW respectively. An example of the times are provided in Table 1.

TABLE 1

| Time-stamps of FIG. 8 | Date and time |
|---|---|
| TV | Jun. 14, 2009, 10:00:07 AM |
| TSV | Jun. 14, 2009, 10:00:10 AM |
| TSW | Jun. 14, 2009, 11:00:15 AM |
| TW | Jun. 14, 2009, 11:00:22 AM |

The times in Table 1 and subsequent tables provide differences in time on the order of seconds. Time may be measured at different granularities to provide suitable differences (e.g., nanoseconds, microseconds, milliseconds, seconds, minutes, hours, days).

Referring to Table 1, the real-time clock for the video device is 3 seconds ahead of the server real-time clock. The real-time clock for the weapon is 7 seconds after the server real-time clock. Assuming that the real-time clock for the server accurately kept time between 10:00 AM and 11:00 AM on Jun. 14, 2009, the difference in time may be used to align a weapon log with a recording for presentation. The alignment is performed by selecting a recording (e.g., record or frame of a recording) of interest and applying the difference in time to the time-stamp of the selected recording to determine the value of a time-stamp in the weapon log, if it exists, that marks a likely concurrent operation of the weapon.

For example, using the time differences of FIG. 8, assume that the time-stamp of selected video has the value Jun. 14, 2009, 6:00:06 AM. The difference in time is applied as shown in Table 2 to determine a time of interest in the weapon log.

TABLE 2

Applying Difference in Time for FIG. 8

| | |
|---|---|
| Jun. 14, 2009, 6:00:06 AM | Time-stamp of selected recording |
| Jun. 14, 2009, 6:00:09 AM | Time of server real-time clock at selected video time |
| Jun. 14, 2009, 6:00:16 AM | Time of corresponding (e.g., aligned) weapon information |

A recording captured at time Jun. 14, 2009, 6:00:06 AM with respect to the real-time clock 112 of the video device 110 corresponds to operations performed by electronic weapon 120 at the time of Jun. 14, 2009 6:00:16 AM with respect to real-time clock 122 of the electronic weapon 120.

A recording from one video device 110 may be aligned with weapon information from any number of electronic weapons 120. A recording from one video device 110 may be aligned with a recording from any number video devices 110. Furthermore, a weapon log may be selected and a recording may be aligned to the time-stamp of the log.

Figure 9:
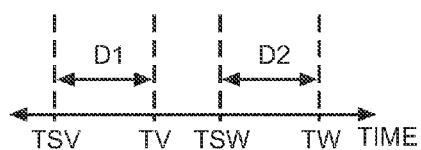

In another example of aligning video and weapon information, referring to FIG. 9, Table 3 discloses the times recorded for the real-time clocks of a video device, an electronic weapon, and a server at the time of transfer of data to the server.

TABLE 3

| Time-stamps of FIG. 9 | Date and time |
|---|---|
| TSV | Mar. 21, 2008, 08:56:12 AM |
| TV | Mar. 21, 2008, 08:56:20 AM |
| TSW | Mar. 21, 2008, 09:35:32 AM |
| TW | Mar. 21, 2008, 09:35:36 AM |

The real-time clock of the video device and the electronic weapon are 8 seconds and 4 seconds respectively after the server real-time clock respectively. Assuming that the time-stamp of the selected recording has the value Mar. 21, 2008, 6:00:45 AM, the difference in time is applied as shown in Table 4 to find corresponding weapon information.

TABLE 4

Applying Difference in Time for FIG. 9

| | |
|---|---|
| Mar. 21, 2008, 6:00:45 AM | Time-stamp of selected recording |
| Mar. 21, 2008, 6:00:37 AM | Time of server real-time clock at selected video time |
| Mar. 21, 2008, 6:00:41 AM | Time of corresponding (e.g., aligned) weapon information |

The recording captured at time Mar. 21, 2008, 6:00:45 AM with respect to the real-time clock 112 of video device 110 corresponds to operations performed by electronic weapon 120 at the time of Mar. 21, 2008, 6:00:41 AM with respect to real-time clock 122 of the electronic weapon 120.

Figure 10:
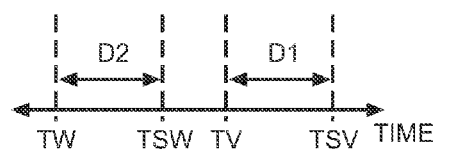
Figure 12:
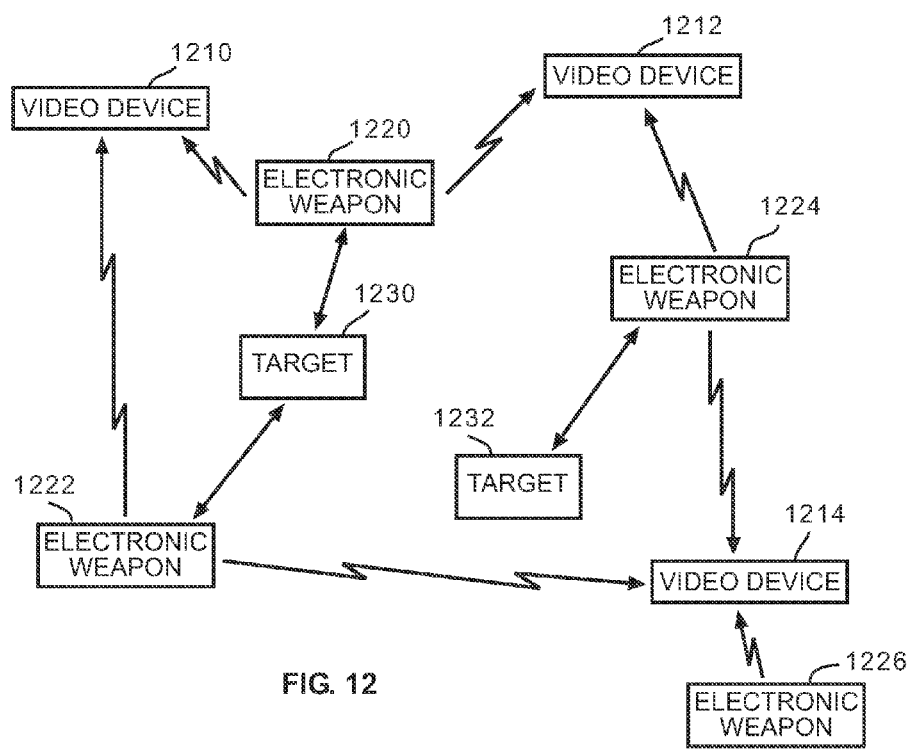
FIG. 12 is a diagram of cooperation between a plurality of video devices and a plurality of electronic weapons to provide information for preparing a presentation according to various aspects of the present invention.

In another example of aligning video and weapon information, referring to FIG. 10, Table 5 discloses the times recorded for the real-time clocks for a video device, an electronic weapon, and a server at the time of transfer of data to the server.

TABLE 5

| Time-stamps of FIG. 10 | Date and time |
|---|---|
| TW | Nov. 24, 2007, 03:41:36 PM |
| TSW | Nov. 24, 2007, 03:41:45 PM |
| TV | Nov. 24, 2007, 06:19:22 PM |
| TSV | Nov. 24, 2007, 06:19:43 PM |

The real-time clock of the electronic weapon and the video device are ahead of the real-time clock of the server by 9 and 21 seconds respectively. Assuming that the time-stamp of the selected recording has the value Nov. 24, 2007, 1:37:22 PM, the difference in time is applied as shown in Table 6 to find corresponding weapon information.

TABLE 6

Applying Difference in Time for FIG. 10

| | |
|---|---|
| Nov. 24, 2007, 01:37:22 PM | Time-stamp of selected recording |
| Nov. 24, 2007, 01:37:43 PM | Time of server real-time clock at selected video time |
| Nov. 24, 2007, 01:37:34 PM | Time of corresponding (e.g., aligned) weapon information |

A recording captured at time Nov. 24, 2007, 01:37:22 PM with respect to the real-time clock 112 of the video device 110 corresponds to operations performed by electronic weapon 120 at the time of Nov. 24, 2007, 01:37:34 PM with respect to real-time clock 122 of the electronic weapon 120.

The accuracy of a difference in time calculation may be affected by the time between creating a recording and/or a log and transferring the recording and/or the log to a server with the present time of the real-time clock of the device. For example, suppose that a video device makes a recording of an incident on Mar. 15, 2010 and that at the time of the recording the present time of the real-time clock of the video device is Mar. 15, 2010, 09:36:42 AM. Suppose that the present time of the real-time clock of the server that will eventually receive the recording is Mar. 15, 2010 09:36:40 AM. At the time the recording is made, the difference in time between the present time of the real-time clock of the video device and the present time of the real-time clock of the server is about 2 seconds. In this example, the recording is not transferred to the server until May 27, 2010. At the time of transfer, the present time of the real-time clock of the video device is May 27, 2010 05:17:12 and the present time of the real-time clock of the server is May 27, 2010 05:17:01, so the difference in time has increased from 2 seconds on Mar. 15, 2010 to 11 seconds on May 27, 2010. The change in the difference in time affects the accuracy of aligning the incident recording to information recorded by other devices and uploaded either closer to the occurrence of the incident or even later than the transfer of the recording from the video device.

Information used to calculate a difference in time should be collected and stored as soon after recording information (e.g., recording, log) as possible. In the case of an authority (e.g., police department), a best practice may include transferring recordings, logs, and present times of real-time clocks of the devices at the end of each shift.

Extrapolation of differences in time may be used to estimate a difference in time of an intermediate incident. In the case of the video device and the server above, the difference in time on Mar. 15, 2010 is 2 seconds and the difference in time on May 27, 2010 is 11 seconds. Extrapolation may be used to estimate a difference in time for an incident recorded by the video device on Apr. 21, 2010, but not uploaded to the server until May 27, 2010. Seventy three (73) days elapse between Mar. 15, 2010 and May 27, 2010 during which the difference in time increases by 9 (11−2) seconds. Using a linear extrapolation (e.g., 9 seconds/73 days), the difference in time on Apr. 21, 2010 is 6.5616 (e.g., 2 seconds+37 days*0.1233 seconds/day) seconds.

Factors (e.g., drift, temperature, power) that may affect the accurate measure of time by a real-time clock may be monitored to determine whether a change in time of a real-time clock is linear or non-linear. Information regarding the rate of change in time of a real-time clock may be used to increase accuracy of extrapolation of a difference in time.

Using the difference in time, each time-stamp of either a recording or a weapon log may be aligned with information from other devices. Alignment on a per frame basis permits information regarding the operation of other devices to be updated for each frame of the recording to eliminate differences in clock rates as well as time offsets. Per frame updates may be used to show an approximate quantity of current pulses delivered to a target over time. A tally may be kept of pulses and/or an amount of charge delivered per frame and updated each frame or every few frames.

With respect to the presentation of FIG. 7, alignment of a recording with weapon logs may be displayed as a pulse delivered count that increases as the frames of video are displayed. For example, the pulse delivered count in the frame just before electrodes 632 and 634 contact the target would be zero. The pulse delivered count in the frame just after electrodes 632 and 634 contact the target may be a few pulses and the pulses delivered count increases every frame or so until the total pulses delivered count of 96 is reached. The amount of current delivered may be aligned and displayed in a similar manner.

Figure 11:
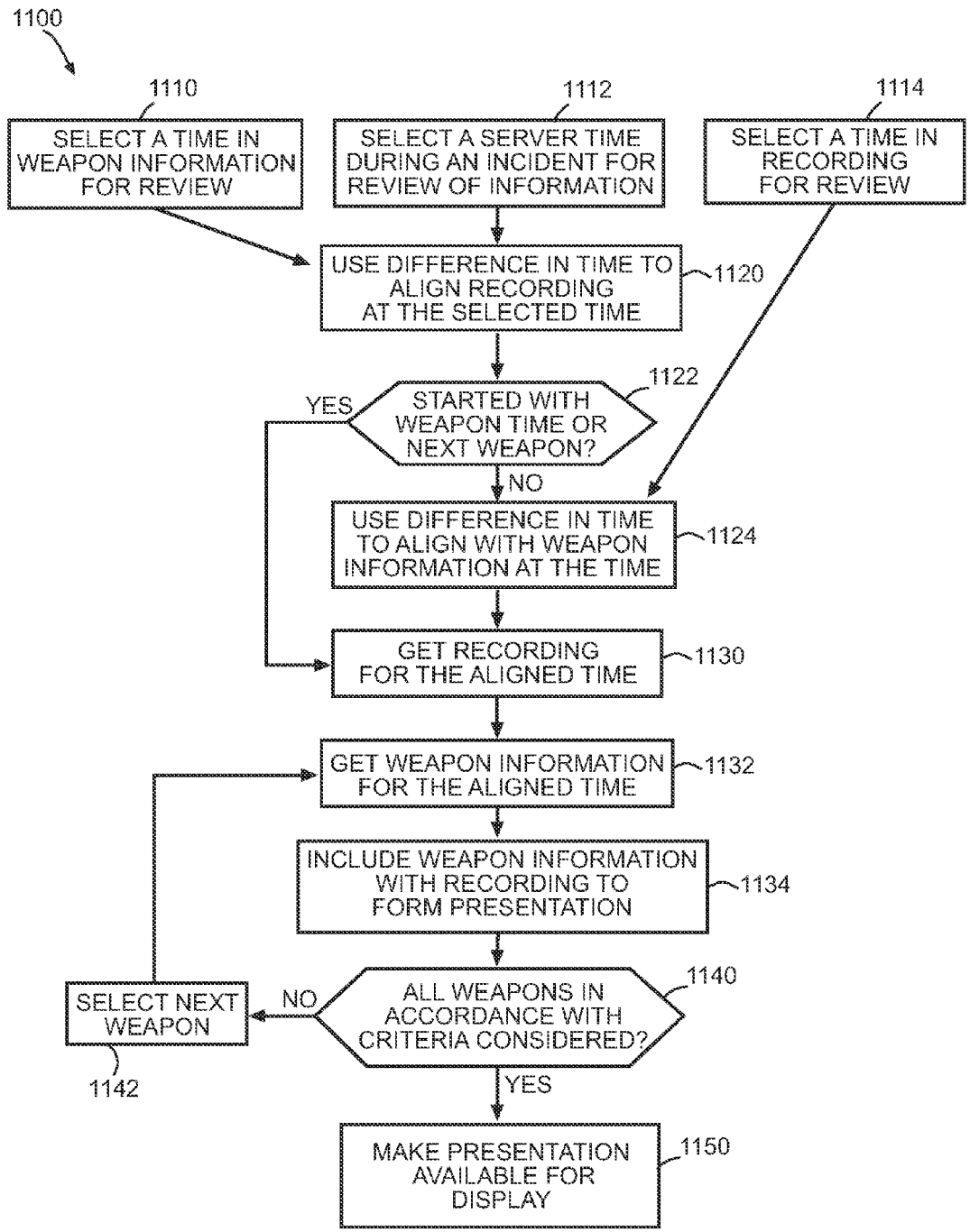
FIG. 11 is a method for preparing a presentation of aligned information according to various aspects of the present invention.

Method 1100 of FIG. 11 includes steps for preparing a presentation using a difference in time, as discussed above, by selecting a point in time with respect to a selected weapon, the server time, or video capture time, aligning the recording at the selected time with information from one or more electronic weapons, and making the presentation available for display.

Method 1100 includes function 1110 to "select a time in weapon information for review" (hereinafter "select weapon time"), function 1112 "select a server time during an incident for review of information (hereinafter "select server time"), function 1114 to "select a time in the recording for review" (hereinafter "select video time"), function 1120 to "use difference in time to align with a recording at the selected time" (hereinafter "align recording"), function 1122 to determine whether the selected time "started with weapon time or next weapon time" (hereinafter "started with weapon"), function 1124 to "use difference in time to align with weapon information at the selected time" (hereinafter "align weapon information"), function 1130 to "get recording for the aligned time" (hereinafter "get aligned video"), function 1132 to "get weapon information for the aligned time" (hereinafter "get aligned weapon"), function 1134 to "include weapon information with recording to form presentation" (hereinafter "combine information"), function 1140 to determine whether "all weapons in accordance with criteria considered?" (hereafter "all weapons considered?"), process 1142 to "select next weapon," and process 1150 to "make presentation available for display" (e.g., for download in full, streaming, on demand) (hereinafter "make presentation available").

Process 1110 "select weapon time" selects a time in stored weapon information in accordance with a time-stamp of a weapon log. The selected time is the time selected to prepare a presentation of information. Selection of a time may be performed by a machine (e.g., server) and/or a human operator of the server. Process 1110 provides the selected time to other processes (e.g., process 1120) for alignment.

Process 1112 "select server time" selects a server time that relates to a recording or a weapon log. A server time may be stored as a server time-stamp as part of a time difference (e.g., 526, 536, 546, 556). Selection of a time may be performed by a machine (e.g., server) and/or a human operator of the server. The selected time is the time selected to prepare a presentation of information. Process 1112 provides the selected time to other processes (e.g., process 1120) for alignment.

Process 1114 "select video time" selects a time in a stored recording in accordance with a time-stamp of the recording. The selected time is the time selected to prepare a presentation of information. Selection of a time may be performed by a machine (e.g., server) and/or a human operator of the server. Using a recording to select a time provides a method for a human operator to review the video of an incident and select a portion of the video that may provide information of interest. Process 1114 provides the selected time to other processes (e.g., process 1124) for alignment.

Process 1120 "align recording" aligns a recording to the selected time from the weapon log. The process of alignment is analogous to the method discussed above for selecting a time in a recording and aligning a weapon log to the selected recording; however, in this process a time-stamp is selected from the weapon log and the recording is aligned to the weapon time-stamp.

Process 1122 "started with weapon" determines if the selected time is a time-stamp selected from a weapon log. Execution of the next step of method 1100 depends on the result determined by process 1122. If the selected time is a time-stamp from a weapon log, control moves to process 1130. If the selected time is not a time-stamp from a weapon log, control moves to process 1124.

Process 1124 "align weapon information" aligns weapon information to a selected time from the recording. An implementation of the process of alignment performed by process 1124 is discussed above. Process 1124 provides an aligned time to other processes (e.g., 1130, 1132) so that the records and log entries taken from the recording and the weapon logs respectively is aligned for preparing a presentation. Information used for alignment may include the differences in time discussed above. Alignment may include application of the difference in time as discussed above (e.g., Tables 2, 4, and 6).

Process 1130 "get aligned video" retrieves a stored recording at the aligned time. The recording is used to prepare a presentation. A recording may include one or more frames of video. The retrieved recording is provided to process 1134 to form a presentation.

Process 1132 "get aligned weapon" retrieves stored weapon log entries at the aligned time. The weapon log entry is used to prepare a presentation. A weapon log may include any of the information discussed above with respect to weapon information. For example, a weapon log may include entries for one or more operations of the weapon. The retrieved weapon log entry is provided to process 1134 to form a presentation.

Process 1134 "combine information" combines a recording and weapon logs for a presentation. Combination of information may include a pre-processing of information prior to combination. Pre-processing may include a transformation of the recording and/or weapon log. Transformation of a recording may include enhancement, cropping, object identification, object highlighting, addition of text, and contextual analysis. A transformation of a weapon log may include merging information from multiple weapons and mathematical operations (e.g., summing, multiplication, integration). A recording may be transformed responsive to weapon information and vice versa. Combined information may be retained until completion of the combining operation as determined by process 1140.

Process 1140 "all weapons considered?" determines whether the logs for weapons selected in accordance with a criteria has been aligned and prepared for presentation. Any criteria may be used to selected weapons whose log is included into a presentation. In an implementation, the criteria for selection includes selecting electronic weapons that were physical located in the geographic area of the captured video during the time of an incident. In another implementation, the criteria for selection includes selecting electronic weapons used by a particular person or weapons having specific weapon identification numbers. If the information from all weapons that match the criteria has not been considered, control moves to process 1142 to select another weapon for consideration.

Process 1142 "select next weapon" selects a next weapon that meets the criteria so that the information stored for the next weapon is considered in preparing the presentation. Process 1140 may include the criteria for identifying whether a weapon should be selected. Once the next weapon is selected, control moves to process 1132 so that log entries may be retrieved from the weapon log at the aligned time for combination with the recording and other weapon log entries by process 1134.

Process 1150 "make presentation available" makes the presentation formed by process 1134 available for display. Making the presentation available includes preparing the data of the presentation for transmission, transmitting the presentation, formatting the data of the presentation for presentation on a display, receiving a request to provide the presentation, storing the presentation, and adding information to identify the presentation (e.g., author, editor, incident, personnel involved, court docket number, investigation number).

Method 1100 may be performed by the processing circuit of server 130. Processes of method 1100 may be performed in serial and/or parallel. A process may be performed as soon as data needed by the process is available. Method 1100 may be executed repeatedly to process one or more presentations or one or more frames of a recording to form a presentation. A server may provide access to stored recordings and weapon logs for execution of method 1100 by one or more other servers with conventional inter-process communication techniques. Each process of method 1100 may be performed by one or more processing circuits.

As discussed above, a server may receive information from one or more video devices and/or electronic weapons and at the time of receipt request a present time from the real-time clock of each device providing information. As discussed above, the present time from the real-time clocks of the video devices, electronic weapons, and server may be used and/or stored to determine a difference in time for aligning information.

In the implementation discussed above, the server requested a present time from each video device and electronic weapon that provided information. In another implementation, video devices request a present time from electronic weapons within communication range of each video device. The video devices store the present time of each electronic weapon with which it communicates and the present time of its own real-time clock at the time of the request. The video devices provide the recorded times to the server while transferring a recording. The server requests the present time of the video device and uses the stored time information from the video device to determine a difference in time between the server, video devices, and electronic weapon real-time clocks.

For example, while capturing a recording at an incident, video device 1210 communicates with electronic weapons 1220 and 1222; video device 1212 communicates with electronic weapons 1220 and 1224; and video device 1214 communicates with electronic weapons 1222 and 1226. Each electronic weapon communicates to the respective video devices 1210, 1212, and 1214 its weapon identification number (e.g., 250). The respective video devices request a present time from the real-time clock (e.g., 122) of the electronic weapons in such a manner as to eliminate delays in transmission as discussed above. Each video device records the present time of each electronic weapon real-time clock and the present time of its own real-time clock (e.g., 112). The video device may further determine a time of difference between its real-time clock and the received real-time clock of each electronic weapon.

When the video device transfers information to a server, the video device provides the recording and the stored real-time clock information. The server requests and receives a present real-time clock value from the video device. When the electronic weapon communicates with the server, the server does not need to request a present real-time clock value from the electronic weapon because the server may use the real-time clock values collected by the video devices to calculate a difference in time for each video device and each electronic weapon as discussed above.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A method performed by a server for presenting a recording and a log in a time aligned manner, the recording captured by a video device at the scene of an incident, the recording comprising a plurality of time-stamps provided by a first real-time clock of the video device, the log captured by an electronic weapon, the log comprising a plurality of time-stamps that relate to provision of one or more pulses of current through a target with reference to a second real-time clock of the electronic weapon, the method comprising:

determining a first difference in time between the first real-time clock of the video device and a third real-time clock of the server;

determining a second difference in time between the second real-time clock of the electronic weapon and the third real-time clock of the server;

in accordance with the first difference in time and the second difference in time, selecting from a received recording and a received log to form a presentation; and providing electronic access to the presentation.

2. The method of claim 1 wherein selecting comprises:

selecting a frame of the recording having a first time-stamp;

selecting an entry from the log having a second time-stamp, selecting being in accordance with the first time stamp, and the first and second differences in time.

3. The method of claim 1 wherein determining a first difference in time comprises:

requesting a present time of the first real-time clock of the video device;

receiving the present time of the first real-time clock of the video device; and adjusting the received present time to account for a communication delay.

4. The method of claim 1 wherein determining a second difference in time comprises:

requesting a present time of the second real-time clock of the electronic weapon;

receiving the present time of the second real-time clock of the electronic weapon; and adjusting the received present time of the electronic weapon to account for a communication delay.

5. The method of claim 1 wherein providing electronic access comprises driving a display in accordance with the presentation.

6. The method of claim 1 wherein providing electronic access comprises transmitting the presentation for display.

7. The method of claim 1 wherein, in accordance with the log, the presentation comprises a graphic of an information.

8. The method of claim 1 wherein, in accordance with the log, the presentation comprises a graphic of a total quantity of pulses of current provided through the target.

9. The method of claim 1 wherein, in accordance with the log, the presentation comprises a bar chart of a quantity of pulses of current provided through the target.

10. A method performed by a server for presenting in a time-aligned manner a recording and a description of use of each electronic weapon of a plurality of electronic weapons, the recording captured by a video device at the scene of an incident, the recording comprising a plurality of time-stamps provided by a first real-time clock of the video device, the description comprising, for each particular electronic weapon, a plurality of time-stamps that each relate to provision of one or more pulses of current through a target with reference to a real-time clock of the particular electronic weapon, the method comprising:

determining a first difference in time between the first real-time clock of the video device and a third real-time clock of the server;

determining a respective second difference in time between a respective second real-time clock of each electronic weapon and the third real-time clock of the server;

in accordance with the first difference in time and each respective second difference in time, aligning a portion of a received video recording to a provision of current through the target to form an aligned information; and providing electronic access to the aligned information for presentation.

11. The method of claim 10 wherein determining a first difference in time comprises:

requesting a present time of the first real-time clock of the video device;

receiving the present time of the first real-time clock of the video device; and adjusting the received present time to account for a communication delay.

12. The method of claim 10 wherein determining a second difference in time comprises:

requesting a present time of the respective second real-time clock of each electronic weapon;

receiving the present time of the respective second real-time clock of each electronic weapon; and adjusting the received present time of each electronic weapon to account for a communication delay.

13. A server for preparing a presentation of a recording and a log of an electronic weapon in a time aligned manner, the recording captured by a video device at the scene of an incident, the recording comprising a plurality of time-stamps provided by a first real-time clock of the video device, the log of the electronic weapon comprising a plurality of time-stamps that relate to provision of one or more pulses of current through a target with reference to a second real-time clock of the electronic weapon, the server comprising:

a processing circuit; and a real-time clock; wherein the processing circuit determines a difference in time between a first real-time clock of the video device and a second real-time clock of the electronic weapon with reference to a third real-time clock of the server;

from the recording, selects for the presentation a frame having a first time-stamp; and from the log, selects for the presentation an entry having a second time-stamp, selecting being in accordance with the first time-stamp of the recording and the difference in time.

14. The server of claim 13 wherein the server:

requests a present time of the first real-time clock of the video device;

receives the present time of the first real-time clock of the video device; and adjusts the received present time to account for a communication delay.

15. The server of claim 13 wherein the server:

requests a present time of the second real-time clock of the electronic weapon;

receives the present time of the second real-time clock of the electronic weapon; and adjusts the received present time to account for a communication delay.

16. A method performed by a video device for aligning a recording captured by the video device with a log of an electronic weapon, the recording comprising a first time stamp with reference to a first real-time clock of the video device, the log of the electronic weapon comprising a second time stamp that relates to provision of one or more pulses of current through a target, the second time stamp with reference to a second real-time clock of the electronic weapon, the method comprising:

determining a difference in time between the first real-time clock of the video device and the second real-time clock of the electronic weapon;

providing electronic access to the recording; and providing electronic access to the difference.

17. The method of claim 16 wherein determining a difference in time comprises
  requesting a present time of the second real-time clock of the electronic weapon; and
  adjusting the present time to account for a transmission delay.

18. A method performed by a server for combining a video recording and a log, the method comprising:
  selecting from the video recording and from the log of an electronic weapon to form a presentation, the recording captured at an incident, the log comprising entries about providing one or more pulses of current through a target at the incident; and
  providing electronic access to the presentation.

19. The method of claim 18 selecting comprises combining the recording and operation information about the weapon for presentation.

20. The method of claim 18 selecting comprises:
  determining an amount of current provided through the target; and
  displaying the amount as part of the presentation.

21. The method of claim 18 selecting comprises:
  determining a number of current pulses provided through the target; and
  displaying the number of current pulses as part of the presentation.

22. A method performed by a server for preparing a time-aligned presentation of a recording and a log of an electronic weapon, the recording captured by a video device, the method comprising:
  aligning the recording and the log of the electronic weapon, the recording comprising a first time stamp related to one or more frames of video, the log of the electronic weapon comprising a second time stamp related to provision of one or more pulses of current through a target to form the time-aligned presentation; and
  providing electronic access to the time-aligned presentation.

23. The method of claim 22 wherein aligning comprises determining a difference between a first time of a first real-time clock of the video device that captured the recording and a second time of a second real-time clock of the electronic weapon that provided the log.

24. The method of claim 22 wherein aligning comprises determining a time of a real-time clock of a video device that captured the recording.

25. The method of claim 22 wherein aligning comprises determining a time of a real-time clock of an electronic weapon that provided the one or more pulses of current through the target.

26. The method of claim 22 wherein aligning comprises:
  for the presentation, selecting a video frame having a time-stamp;
  determining an aligned time for the log in accordance with the time-stamp; and
  for the presentation, selecting a log entry from the log in accordance with the aligned time.

27. The method of claim 22 wherein aligning comprises:
  determining a difference in time between a first real-time clock of a video device that captured the recording and a third real-time clock of the server; and
  determining a difference in time between a second real-time clock of an electronic weapon that provided the one or more pulses of current through the target and the third real-time clock of the server.

28. The method of claim 22 wherein providing electronic access comprises providing access to a display via a channel of a network.

* * * * *